3,111,842
SUPERSONIC WIND TUNNEL
Raymond O. Fredette, Mount Prospect, and Arthur R. Anderson, Glenview, Ill., assignors to Cook Electric Company, Chicago, Ill., a corporation of Delaware
Filed July 19, 1960, Ser. No. 43,882
4 Claims. (Cl. 73—147)

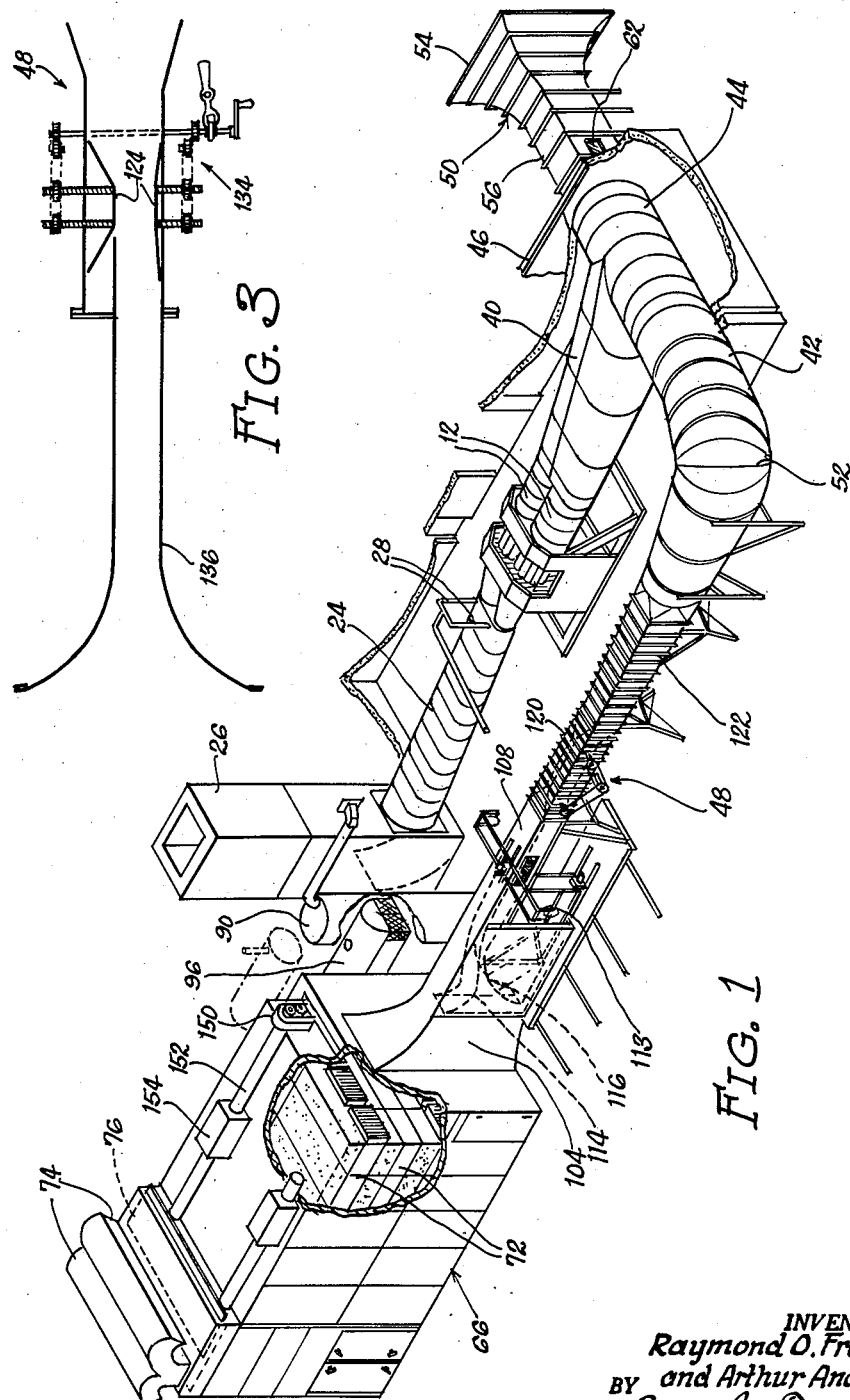

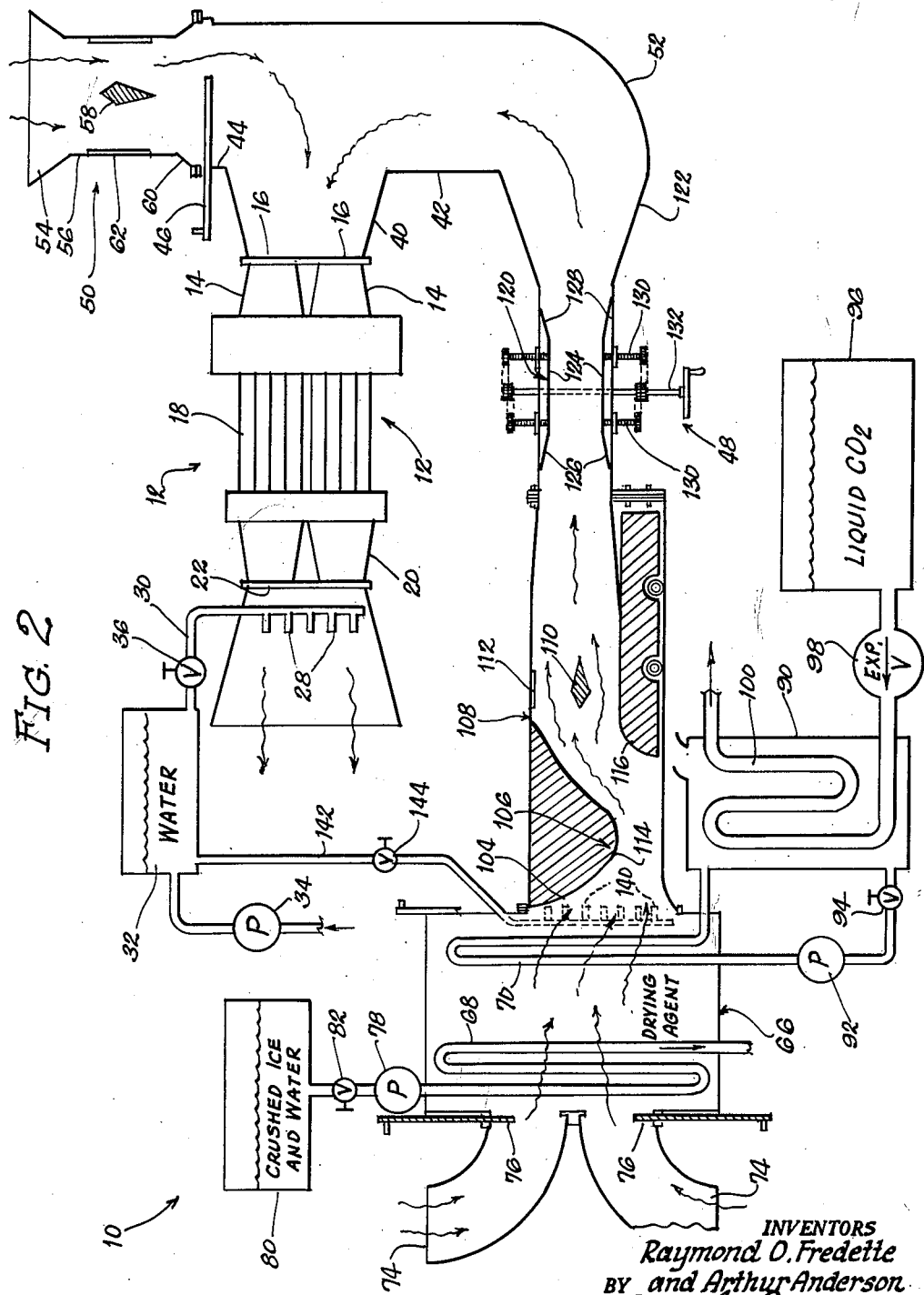

This invention relates to a new and improved wind tunnel for making aerodynamic tests.

One object of the present invention is to provide a new and improved wind tunnel which is extremely versatile, in that it is capable of making aerodynamic tests at subsonic, transonic and supersonic velocities.

A further object is to provide a new and improved wind tunnel of the foregoing character which is also capable of making icing tests at high speeds.

Another object is to provide a wind tunnel which is arranged in a new and improved manner so as to utilize one or more turbojet engines for moving air at high velocities through the wind tunnel.

A further object is to provide a new and improved wind tunnel of the foregoing character which is equipped with facilities for cooling and drying the air which is drawn into the wind tunnel, so that conditions at high altitudes may readily be simulated.

It is another object to provide a new and improved wind tunnel which may be put into operation quickly and which is economical to construct and operate.

Further objects and advantages of the present invention will appear from the following description, taken with the accompanying drawings, in which:

FIG. 1 is a general perspective view showing a wind tunnel to be described as an illustrative embodiment of the present invention, certain parts being broken away for clarity of illustration.

FIG. 2 is a diagrammatic sectional view showing the layout of the wind tunnel.

FIG. 3 is a fragmentary diagrammatic view, corresponding to a portion of FIG. 2, but showing a modification.

As already indicated, FIGS. 1 and 2 illustrate a wind tunnel 10 which is highly economical, yet is capable of making aerodynamic tests at supersonic velocities up to Mach 2.7 (2.7 times the speed of sound) or even higher, for example. The wind tunnel is also capable of making tests at lower velocities. In this case, an extremely large amount of power for moving air through the wind tunnel is provided at very low cost by means of one or more turbo-jet engines 12 of the type commonly used on jet aircraft. In this case, two jet engines are employed, but the number may be varied according to the power that is required. Each jet engine 12 has a compressor turbine 14 which draws in air through an intake opening 16. The compressed air passes into a combustioin section 18 where fuel is injected and burned. The hot gases from the combustion section 18 pass through a power turbine 20 and are discharged from a discharge opening 22. It has been found that suitable jet engines are generally available as military surplus items at extremely low cost. In this case, the turbojet engines 12 are employed to draw a large amount of air from the atmosphere and through the wind tunnel at high speed.

The exhaust gases from the jet engines 12 may be discharged into a duct 24. As shown in FIG. 1, the exhaust duct 24 is connected to a vertical stack 26 which discharges the exhaust gases upwardly into the atmosphere. The stack 26 effectively dissipates and reduces the noise produced by the jet engines 12. In order to cool the exhaust gases, water may be sprayed into the exhaust pipe 24 through water nozzles 28. A pipe 30 may be connected between the nozzles 28 and a tank 32, representing a source of water under pressure. Water may be supplied to the tank 32 by a pump 34 connected to a suitable source of water. A valve 36 is connected into the pipe 30 to shut off and regulate the flow of water to the nozzles 28.

It will be seen that a branching duct 40 is connected to the intake openings 16 of the jet engines 12. As shown, the duct 40 has two branches 42 and 44. Air may be drawn into either or both of the branches 42 and 44. A gate 46 is provided to regulate or shut off the flow of air into the branch 44. The gate 46 may be closed so that all of the air will be drawn into the jet engines 12 through the branch 42.

A main testing duct or circuit 48 may be connected to the branch 42, while a second testing duct or circuit 50 is connected to the branch 44. To provide a compact arrangement, the main testing duct 48 is preferably parallel to the axes of the jet engines 12. Thus, the branch 42 extends at right angles to the axes of the jet engines, and the main testing duct 48 is connected to the branch by an elbow 52.

As shown, the secondary testing duct 50 has a flaring entrance portion 54 which communicates directly with the atmosphere. The entrance portion 54 is connected to a constricted test section 56 of reduced cross section, in which a model 58 may be mounted for aerodynamic tests. A flaring diffuser section 60 is connected between the test section 56 and the branch pipe 44. The test section 56 is employed primarily for subsonic tests on relatively large models. The jet engines 12 are capable of moving a large volume of air at subsonic speeds through the secondary testing duct 50. The use of the duct 50 for aerodynamic tests has the advantage that the model 58 may be observed through the open entrance portion 54 of the duct 50. Of course, windows 62 may also be provided in the test section 56 for observing the model 58. When the secondary duct 50 is in use, the gate 46 is opened. The main testing duct 48 may be closed off, in a manner to be described shortly. When tests are to be run in the main duct 48, the gate 46 is normally closed. For certain tests, the gate 46 may be partially opened so as to bleed air into the intake openings 16 of the jet engines 12. In this way, an adequate supply of air may be provided to insure the proper operation of the jet engines.

The main testing duct 48 is preferably provided with facilities for cooling and drying the air which is drawn into the duct from the atmosphere. Thus, the main duct 48 has an enlarged entrance housing 66 which contains cooling coils 68 and 70 and drying facilities 72. In this case, atmospheric air enters the top of the housing 66 through gooseneck hoods 74 which exclude rain. The hoods are shown to best advantage in FIG. 1. A gate 76 is provided for partially or completely closing the entrance to the housing 66.

As shown to advantage in FIG. 1, the drying facilities 72 may take the form of beds of a drying agent, such as activated alumina, for example, adapted to extract moisture from the air. The cooling coils 68 and 70 may be arranged to provide two stages of cooling. Thus, a mixture of crushed ice and water may be circulated through the cooling coils 68 by a pump 78, which may receive the mixture from a tank 80. A valve 82 may be provided to regulate the flow of the ice and water mixture through the cooling coils 68. As shown, the air passes over the coils 68 before passing through the drying facilities 72.

In order that the air may be cooled to an extremely low temperature, the second cooling coils 70 may be supplied with a liquid refrigerant which has been cooled by liquid carbon dioxide or the like. As shown, the refrigerant is stored in a tank 90 and may be circulated through the coils 70 by a pump 92. A valve 94 may be employed to regulate the circulation of the refrigerant. A supply of liquid carbon dioxide may be held in a tank 96. As shown, the carbon dioxide passes through an expansion valve 98 and then through coils 100 which are in contact with the liquid refrigerant in the tank 90. After cooling the refrigerant, the carbon dioxide may be allowed to escape into the atmosphere. The refrigerant which is circulated through the coils 70 may take the form of a liquid having a low freezing point, such as trichloroethylene, for example.

The main testing duct 48 has a flaring entrance portion 104 which receives the air from the housing 66. The air then passes through a constricted nozzle 106. The constriction of the nozzle causes the velocity of the air to increase greatly, so that supersonic velocities may be achieved. The air then passes through a test section 108 in which a model 110 may be mounted for aerodynamic tests. One or more windows 112 may be provided in the test section 108 so that model may be observed and photographed. A shadowgraph optical system of an optical system of the Schlieren type may be employed for observing shock wave patterns around the model 110. Thus, the Schlieren optical system is represented at 113 in FIG. 1. Additional instrumentation of any desired type may be employed in connection with the model 110.

The illustrated nozzle 106 is of the asymmetrical adjustable type, having a fixed block 114 and an adjustable block 116. The fixed block 114 projects into the duct 48 so as to produce a constriction. The degree of the constriction may be adjusted by moving the adjustable block 116 longitudinally along the duct 48, toward and away from the fixed block 114. Any other type of fixed or adjustable nozzle may be employed in the duct 48.

After passing through the test section 108, the air passes through an adjustable diffuser nozzle 120 and a fixed flaring diffuser section 122 which communicates with the elbow 52. As shown, the adjustable diffuser nozzle 120 comprises a pair of plates 124 which are parallel to the air stream and are movable toward and away from each other so as to vary the degree of constriction afforded by the nozzle. Pairs of plates 126 and 128 extend obliquely between the ends of the adjustable plates 124 and the walls of the duct 48 so as to provide smoothly flaring entrance and exit portions of the nozzle 120. The nozzle plates 124 may be adjusted by a system of screws 130 which may be rotated simultaneously by means of a shaft 132.

As shown in FIG. 3, a gear-shifting mechanism 134 may be provided so that each of the plates 124 may be moved independently of the other plate, if desired. In this way, the diffusing nozzle 120 may be rendered asymmetrical, as represented in FIG. 3. This view illustrates a modified construction in which the adjustable nozzle 106 is replaced by a fixed nozzle 136. One of the plates 124 is moved close to the wall of the duct 48, while the other plate 124 is moved away from the opposite wall, so that the plates will line up with the walls of the nozzle 136. This arrangement reduces the losses in the system.

For efficient supersonic operation with the adjustable nozzle 106 of FIG. 2, the diffuser nozzle 124 may be adjusted so as to reduce the losses in the system and thereby increase the Mach number that is obtainable in the test section 108 of the wind tunnel.

When an extremely small nozzle section is employed in the main duct 48, it may be necessary or desirable to bleed additional air into the jet engines 12 by partially opening the gate 46 in the secondary branch 44. In this way, sufficient air is supplied to the jet engines to maintain them in operation.

For use in making icing tests, spray nozzles 140 are provided for introducing water droplets into the entrance 104 of the main testing duct 48. For such icing tests, the air is generally cooled to a low temperature by the use of the cooling coils 68 and 70. The combination of the low air temperature and introduction of water through the nozzles 140 subject the model 110 to icing conditions. The water may be delivered under pressure to the nozzles 140 from the tank 32 by a pipe 142 with a regulating valve 144 connected therein.

During use, the drying agent in the drying beds 72 absorbs moisture from the air. Eventually the drying agent absorbs moisture to such an extent that it loses its ability to extract moisture from the air. The drying agent may be dried out, and thereby regenerated, by circulating heated air through the housing 66. For this purpose, one or more fans 150 are provided to force air through ducts 152 which lead into the housing. Heaters 154 may be connected into the ducts 152 to heat the air. Two such systems are provided in the illustrated construction.

The wind tunnel may be put into operation very quickly, because the jet engines 12 may be started and brought up to operating speed in a short time. The speed of the engines 12 may be varied to control the amount of air that is drawn through the wind tunnel. The speed of the engines also affects the velocity of the air stream in the wind tunnel. The asymmetrical nozzle of the type shown may be adjusted to achieve supersonic speeds in the wind tunnel. Thus, a Mach number of 2.7 or higher may be achieved, for example. Of course, any lower velocity may also be achieved. For low velocity tests requiring the movement of a high volume of air, the secondary testing duct 50 may be employed, and the main duct 48 may be closed by shutting the gate 76. When the main duct 48 is being used, the gate 76 will be open and the gate 46 will normally be closed. However, in some cases, the gate 46 may be partially opened to bleed additional air into the jet engines 12.

Because of the low cost of the jet engines and the other components, the wind tunnel may be constructed at low cost. Moreover, the low cost of the jet fuel makes it possible to operate the tunnel on an extremely economical basis.

Nevertheless, the tunnel is extremely versatile, because it may be operated at subsonic, transonic and supersonic velocities by selecting the proper nozzle arrangement and adjusting the jet engines to the desired speed. By using the cooling coils, the air in the main testing duct may be cooled to subzero temperatures or any higher temperature. To eliminate moisture which might otherwise be condensed from the atmospheric air, the air may be passed through the drying beds 72. On the other hand, water may be introduced into the cold air stream so as to produce icing conditions. Thus, the tunnel is capable of carrying out a wide variety of tests on aircraft components and other models.

Various other modifications, alternative constructions and equivalents may be employed without departing from the true spirit and scope of the invention, as exemplified in the foregoing description and defined in the following claims.

We claim:

1. In a wind tunnel, the combination comprising a turbojet engine having intake and exhaust sections, an exhaust stack extending between said exhaust section of said turbo jet engine and the atmosphere, a branching duct connected to said intake section of said turbojet engine and having first and second branches, a first test duct connected to said first branch and having an entrance section opening to the atmosphere for receiving air therefrom, a first gate for closing off and regulating communication between the atmosphere and said entrance section of said first duct, means in said entrance section for cooling the air drawn from the atmosphere, means in said entrance section for drying the air drawn from the atmosphere, means for injecting water into said entrance section for producing icing conditions in said first test duct, a second test duct connected to said second branch, and a second gate for constricting and closing said second test duct, said second test duct having an entrance portion opening to the atmosphere for drawing atmospheric air therefrom, said second gate being disposed between said second test duct and said second branch, said entrance portion of said second test duct being open to the atmosphere at all times, said second gate being operable to bleed air into said turbojet engine while air is being drawn through said first test duct.

2. A versatile multi-purpose wind tunnel, comprising a turbojet engine having an entry section for sucking in air, a first tunnel duct connected to said entry section of said engine, said first tunnel duct having an intake section, a first gate for opening and closing said intake section to the atmosphere, means in said intake section for cooling the air drawn into said intake section, means in said intake section for drying the air drawn into said intake section, a first test section of said tunnel duct connected between said intake section and said engine, said test section having adjustable nozzle means for regulating the quantity and velocity of the air flowing in said test section, additional adjustable nozzle means in said duct downstream from said test section for reducing the losses in said duct, a second tunnel duct connected to said entry section of said turbojet engine, said second tunnel duct having an intake section and a test section connected between said last mentioned intake section and said entry section of said engine, and means for regulating and shutting off the flow of air through said second tunnel duct, said last-mentioned means being disposed between said last-mentioned test section and said entry section of said engine, said intake section of said second duct being open to the atmosphere at all times, said last mentioned means being adjustable to bleed a quantity of additional air into said entry section for sustaining the operation of said turbojet engine.

3. In a wind tunnel, the combination comprising a turbojet engine having intake and exhaust sections, a branching duct connected to said intake section of said turbojet engine and having first and second branches, a first test duct connected to said first branch and having an entrance section opening to the atmosphere for receiving air therefrom, a first gate for closing off said first duct, a second test duct connected to said second branch, and a second gate for constricting and closing said second test duct, said second test duct having an entrance portion opening to the atmosphere for drawing atmospheric air therefrom, said second gate being disposed between said second test duct and said second branch, said entrance portion of said second test duct being open to the atmosphere at all times, said second gate being operable to bleed air into said turbojet engine while air is being drawn through said first test duct.

4. A versatile multi-purpose wind tunnel, comprising a turbojet engine having an entry section for sucking in air, a first tunnel duct connected to said entry section of said engine, said first tunnel duct having an intake section, a first gate for opening and closing said intake section to the atmosphere, a first test section of said tunnel duct connected between said intake section and said engine, said test section having adjustable nozzle means for regulating the quantity and velocity of the air flowing in said test section, a second tunnel duct connected to said entry section of said turbojet engine, said second tunnel duct having an intake section and a test section connected between said last mentioned intake section and said entry section of said engine, and means for regulating and shutting off the flow of air through said second tunnel duct, said last-mentioned means being disposed between said last-mentioned test section and said entry section of said engine, said intake section of said second duct being open to the atmosphere at all times, said last mentioned means being adjustable to bleed a quantity of additional air into said entry section for sustaining the operation of said turbojet engine.

References Cited in the file of this patent
UNITED STATES PATENTS

| 2,309,938 | Diserens et al. | Feb. 2, 1943 |
| 2,592,322 | Nerad | Apr. 8, 1952 |
| 2,657,575 | Allen | Nov. 3, 1953 |
| 2,805,571 | Graham | Sept. 10, 1957 |
| 2,914,941 | Frenzl | Dec. 1, 1959 |

FOREIGN PATENTS

| 635,609 | Great Britain | Apr. 12, 1950 |
| 1,066,135 | France | Jan. 20, 1954 |